US006239201B1

(12) United States Patent
Edelmann et al.

(10) Patent No.: US 6,239,201 B1
(45) Date of Patent: May 29, 2001

(54) AQUEOUS PIGMENT AND/OR FILLER DISPERSIONS CONTAINING A SPECIAL COMBINATION OF DISPERSING AGENTS

(75) Inventors: Dirk Edelmann, Wuppertal; Günter Link, Goslar; Jan Mazanek, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/268,369

(22) Filed: Mar. 15, 1999

(51) Int. Cl.$^7$ ...................................................... C08K 5/51
(52) U.S. Cl. ................................................................ 524/148
(58) Field of Search .............................. 523/402; 524/148

(56) References Cited

U.S. PATENT DOCUMENTS

| 3,804,656 | * | 4/1974 | Kaliski | 106/308 |
| 4,404,253 | * | 9/1983 | Kohler | 428/327 |
| 5,110,358 | * | 5/1992 | Mongoin | 106/462 |
| 5,266,622 | | 11/1993 | Mazanek et al. | 524/131 |
| 5,548,036 | | 8/1996 | Kroner et al. | 525/419 |
| 5,643,974 | * | 7/1997 | Simpson | 523/334 |
| 5,770,651 | | 6/1998 | Traubel et al. | 524/591 |
| 5,972,378 | * | 10/1999 | Terren | 424/450 |

FOREIGN PATENT DOCUMENTS

| 3101939 | 7/1982 | (DE) . |
| 1262280 | 2/1972 | (GB) . |
| 1593582 | 7/1981 | (GB) . |
| 56-115630 | 9/1981 | (JP) . |
| 57-95396 | 6/1982 | (JP) . |
| 861377 | 9/1981 | (SU) . |
| 903438 | 2/1982 | (SU) . |

OTHER PUBLICATIONS

Chem. Abstracts. vol. 90, No. 24, Jun., 1998 Abstract No. 188631s, XP–002107119.

* cited by examiner

Primary Examiner—Paul R. Michl
(74) Attorney, Agent, or Firm—Joseph C. Gil; Thomas W. Roy

(57) ABSTRACT

The present invention relates to an aqueous dispersion containing a pigment and/or a filler and, as dispersing agent, A) 50 to 90 wt. % of a non-ionic alkylene oxide adduct having a number average molecular weight of 2000 to 100,000, B) 0 to 40 wt. % of a salt of a polycarboxyl compound, C) 5 to 40 wt. % of a salt of an acidic (poly)phosphate ester and D) 0 to 60 wt. % of a water-soluble or water-dispersible polyurethane oligomer, wherein the sum of the components A)+B)+C)+D) equals 100 wt. %, based on the weight of A), B), C) and D), and the amount of at least one of components B) or D) is not 0.

18 Claims, No Drawings

AQUEOUS PIGMENT AND/OR FILLER DISPERSIONS CONTAINING A SPECIAL COMBINATION OF DISPERSING AGENTS

BACKGROUND OF THE INVENTION

1. Field of the Invention

The present invention relates to aqueous dispersions containing fillers and/or pigments and novel dispersing agent mixtures.

2. Description of the Prior Art

Aqueous dispersions of fillers and/or pigments, which can be used, for example, as pigment pastes in coating compositions for buildings, generally have a solids content of 30 to 90 wt. %. The dispersing agent should impart suitable rheological properties to the dispersion at the desired solids content and, in the case of pigment pastes, the property of being readily incorporated into corresponding coatings and paints. The dispersing agent or wetting agent should also improve the wetting of the materials to be dispersed or wetted, facilitate deagglomeration during the dispersion process and stabilize the finished dispersion against agglomeration, sedimentation and flooding.

Organic and inorganic dispersing agents for these purposes are known. Phosphates, polyphosphates or sodium hexametaphosphate are used as inorganic dispersing agents.

Organic dispersing agents include polymers and copolymers of methacrylic and acrylic acid having a low to average molecular weight. DE-A 2,700,444 describes the use of copolymers of maleic acid derivatives; JP-A 57/095 396 describes the use of copolymers of acrylic acid and of styrenesulfonic acid; JP-A 56/115630 describes the use of copolymers of unsaturated sulfonic acids; and DE-OS 3,101,939 describes the use of phosphorus-containing polyacrylic acid copolymers. The use of sulfonated polyester resins is described in SU-A 861,377 and the use of derivatives of styrene-maleic anhydride copolymers is disclosed in SU-A 903,438. The use of low molecular weight non-ionic surfactants is described in BE-A 741,374.

The effectiveness of the known dispersing agents is in many cases not adequate to obtain pigment pastes and/or dispersions having optimal properties for technical use. If the viscosity of such pigment pastes and/or dispersions is too high, the solids content has to be decreased in order to obtain technically usable dispersions, for example, coating compositions to be applied by brushing. This leads, however, to deterioration in the quality of these paints, in particular their strength of color, covering power and/or film formation.

In the case of pigment pastes, a non-optimal dispersion process leads to deterioration of the stability of the pastes and of the paints and coatings produced therefrom. The depth of color of the resulting coatings is also not optimal.

Accordingly, it is an object of the present invention to provide new dispersing and wetting agents for the preparation of pigment and/or filler pastes having improved properties.

This object may be achieved with the aqueous compositions according to the invention, which are described hereinafter.

SUMMARY OF THE INVENTION

The present invention relates to an aqueous dispersion containing a pigment and/or a filler and, as dispersing agent, A) 50 to 90 wt. % of a non-ionic alkylene oxide adduct having a number average molecular weight of 2000 to 100,000, B) 0 to 40 wt. % of a salt of a polycarboxyl compound, C) 5 to 40 wt. % of a salt of an acidic (poly)phosphate ester and D) 0 to 60 wt. % of a water-soluble or water-dispersible polyurethane oligomer, wherein the sum of the components A)+B)+C)+D) equals 100 wt. %, based on the weight of A), B), C) and D), and the amount of at least one of components B) or D) is not 0.

DETAILED DESCRIPTION OF THE INVENTION

Component A) is present in a quantity of 50 to 90 wt. %, preferably 60 to 80 wt. %. Component C) is present in a quantity of 5 to 40 wt. %, preferably 10 to 40 wt. % and more preferably 10 to 30 wt. %. Components B) and D) are present, preferably independently of one another, each in a quantity of preferably 0 to 40 wt. % and more preferably 20 to 40 wt. %.

Mono-, di- and polyfunctional species are suitable for use as non-ionic alkylene oxide adducts A). Examples include condensation products of alkylene oxides with any compounds containing active hydrogen. The alkylene oxides contain 2 to 20 carbon atoms, preferably 2 or 3 carbon atoms. The compounds containing active hydrogen include mono-, di- or polyfunctional, optionally substituted phenols, alcohols, thioalcohols or amines. Condensation products of alkylene oxides with α,ω-aminopolyethers are also suitable, e.g., those having number average molecular weights of 200 to 100,000, preferably of 500 to 60,000.

A particularly preferred group of compounds suitable for use as component A) corresponds to formula (I)

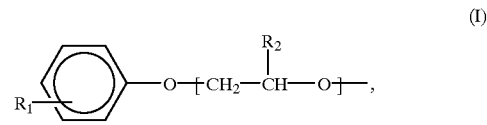

wherein
R₁ represents an aliphatic, aromatic or araliphatic group having 1 to 40 carbon atoms,
R₂ represents hydrogen, phenyl or an alkyl group having 1 to 12 carbon atoms and
n has a value of 1 to 200, preferably 4 to 100 and more preferably 6 to 30.

Suitable components A) are described in DE-A 3,815,299.

Examples of compounds suitable for use as component B) are homopolymers and copolymers of methacrylic and/or acrylic acid and salts thereof. Preferred are those which have a number average molecular weight of 800 to 40,000, more preferably 1000 to 20,000, and are present in the form of their sodium salts, potassium salts or ammonium salts. Other oligomers containing carboxyl groups, such as salts of polyaspartic acid or homo or copolymers thereof having number average molecular weights of 200 to 30,000, are also suitable. Low molecular weight carboxylates, such as salts of phosphonobutanetricarboxylic acids or iminosuccinic acids, are particularly suitable.

Known salts of phosphoric and polyphosphoric acid are suitable for use as component C). Salts of di- and monoalkylphosphates with organic amines such as dimethylethanolamine, methyldiethanolamine, triethanolamine or dimethylaminocyclohexane are particularly preferred.

Known water-soluble or water-dispersible oligourethanes are suitable as component D). Examples include the reaction products of polyisocyanates with hydrophilic polyethers and optionally a tertiary amino compound. The presence of component D) provides an improvement in the dispersions according to the invention if they are prepared from pigments or fillers which are not readily dispersible, such as carbon black, quinacridone or phthalocyanines.

The aqueous dispersions according to the invention contain the combination of dispersing agents in quantities of 0.02 to 200 wt. %, preferably 0.05 to 100 wt. % and more preferably 0.5 to 80 wt. %, based on the remainder of the solids present in the dispersion, i.e., the solids content of the dispersion excluding the dispersing agent.

The dispersions of pigment pastes or filler pastes containing the combinations of dispersing agents according to the invention are distinguished by having improved flow properties, especially when compared to dispersions that contain only one dispersing agent.

Components C) and D) may be selected according to known methods, for example, on the basis of viscosity measurements made on the dispersions or on pigment pastes. Combinations of components A)+C)+B) and/or D) are particularly preferred. The ratio to one another of the components A) to D) can be varied in different filler and/or pigment compositions. The effectiveness of combinations of dispersing agents according to the invention may optionally be optimized by varying the proportions of the individual components to one another, in order to obtain dispersions or pigment pastes having the best possible flow properties. The respective optimal ratio of components can be easily determined by screening tests.

Any organic and inorganic solids are suitable for use as fillers and pigments. Examples include organic pigments such as phthalocyanines, benzidines, arylamide yellow, nickel azo yellow, diarylidones, isoindolines, perylene red, thioindigo red, quinacridone violet and carbon black; inorganic pigments such as titanium dioxide, iron oxides, zinc oxides, chromates, molybdates and cobalt spinels; and fillers such as silicates, aluminum titanates, silicon nitrites, barium sulfate and calcium sulfate. Metal powders are also suitable, for example, for the production of ceramics.

The dispersions according to the invention may contain 5 to 95 wt. % solids, preferably 15 to 80 wt. % and more preferably 30 to 70 wt. %.

The dispersions according to the invention can be prepared in known manner. For example, the mixtures of dispersing agents selected after preliminary tests can be dissolved in water or in a mixture of solvents and water and the pigments and/or fillers can then be dispersed with stirring. The combination of dispersing agents, water and the solids can also be mixed in a mill and milled together. Preferably, the solids are initially dispersed with component A) and subsequently mixed with the other components of the dispersing agent. Water may optionally water be added. In this way dispersions having greatly improved flow properties may be obtained.

The pH value of dispersions according to the invention can influence the flow properties. The optimal pH value in each case can optionally be determined by simple optimization experiments. It is generally about 5 to 10.

The dispersions according to the invention may optionally contain known additives, such as binders, flow-control agents, dyes and/or defoamers.

The dispersions according to the invention, in particular their flow properties, may be assessed, for example, from viscosity measurements. Screening tests are carried out to greater advantage with more concentrated dispersions than those used in practice. Another possible method of assessing the dispersions according to the invention is the assessment of the depths of color of the coatings which are produced with the aid of pigment concentrates according to the invention.

EXAMPLES

1. Preparation of pigment pastes

Pastes were prepared corresponding to the formulations given in Table 1.

| Batch No. | 1 | 2 | 3 | 4 | 5 | 6 | 7 |
|---|---|---|---|---|---|---|---|
| Phthalocyanine blue RS (Hoechst AG) | 44.0 | 44.0 | 44.0 | 44.0 | 44.0 | 44.0 | 44.0 |
| Borchigen DFN[1] | 8.0 | 8.0 | | | | | |
| Emulsifier WN[2] | | | 8.9 | 8.9 | 8.9 | 8.9 | 8.9 |
| Borchigen ND[3] | | 3.0 | | 3.0 | 3.0 | 3.0 | |
| Borchigen VP 9703[4] | | | | | | | 3.0 |
| Borchigen VP 9630[5] | | 2.0 | | 2.0 | | | |
| Borchigen VP 9631[6] | | | | | 2.0 | | 2.0 |
| Borchigen SN 95[7] | | | | | | 3.0 | |
| AMP 90[8] | 2.0 | 2.0 | 2.0 | 2.0 | 2.0 | 2.0 | 2.0 |
| Nopco 8034 E[9] | 0.2 | 0.2 | 0.2 | 0.2 | 0.2 | 0.2 | 0.2 |
| Propylene glycol | 0.7 | 0.7 | 0.7 | 0.7 | 0.7 | 0.7 | 0.7 |
| Water | 45.1 | 40.1 | 45.1 | 39.2 | 39.2 | 38.2 | 40.1 |

[1] Alkylene oxide adduct corresponding to component A, from Borchers GmbH
[2] Alkylene oxide adduct corresponding to component A, from Bayer AG (90%)
[3] Dimethylaminocyclohexane salt of a mixture of phosphate esters corresponding to component C, from Borchers GmbH
[4] Dimethylaminocyclohexane salt of a phosphate ester corresponding to component C, from Borchers GmbH
[5] Iminodisuccinate salt corresponding to component B, from Borchers GmbH
[6] Polyaspartate salt corresponding to component B, from Borchers GmbH
[7] Polyurethane oligomer corresponding to component D, from Borchers GmbH
[8] 2-Amino-2-methyl-1-propanol 90% in water, from Angus-Chemie GmbH
[9] Mineral oil defoamer from Henkel KGaA The pastes were prepared by weighing out all the components together and then dispersing them in the Skandex for 1 hour, using 2 mm glass beads.

The viscosities of the resulting pastes were measured in a Haake VT 550 rotational viscometer (23° C.; 10.3 s$^{-1}$). The following values were obtained (Table 2):

| Batch No. | 1 | 2 | 3 | 4 | 5 | 6 | 7 |
|---|---|---|---|---|---|---|---|
| Viscosity [mPa · s]: | 4000 | 450 | 4500 | 800 | 550 | 800 | 500 |

It can be seen from the Examples that the pastes prepared using the mixtures of the components A, B+C or A, C+D according to the invention have viscosities lower than those of pastes containing only component A.

2. Incorporation of pastes 1 to 7 into a water-dilutable alkyd resin

In order to assess the quality of the pigment wetting and the behavior in a binder, the pastes from batches 1 to 7 were incorporated into a water-dilutable alkyd resin which dries by oxidation (Resydrol AY 586 W from Hoechst AG).

The following formulation was used:

| | |
|---|---|
| Alkyd resin | 48.25 g |
| Octa-Soligen Cobalt 7 aqua | 0.40 g (siccative, Borchers GmbH) |
| Borchinox M2 | 0.10 g (methyl ethyl ketoxime from Borchers GmbH) |
| Pigment paste 1 to 7 | 1.25 g |

The siccative and ketoxime were stirred into the binder and then the pigment pastes were stirred in by hand. To achieve greater homogenization, the dye was sheared in the Skandex for a further 5 minutes, without glass beads.

The resulting coatings were knife-coated in a wet film thickness of 100 µm and after 24 hours the haze and the gloss were measured using a haze-gloss apparatus (Byk-Gardner):

TABLE 3

Optical values of films with different pastes

| Batch No. | 1 | 2 | 3 | 4 | 5 | 6 | 7 |
|---|---|---|---|---|---|---|---|
| Haze | 183.0 | 32.9 | 152.1 | 28.1 | 30.8 | 34.3 | 28.5 |
| Gloss 20° | 75.1 | 88.0 | 76.2 | 87.0 | 87.0 | 86.1 | 88.2 |
| Gloss 60° | 89.9 | 94.1 | 90.3 | 92.2 | 92.9 | 92.9 | 93.2 |

From the values in Table 3 it can be seen that again the films containing the mixtures according to the invention have better optical properties than do those containing only component A.

3. Testing of pastes 1 to 7 in an emulsion paint

Tests were conducted to find out how the pastes containing the combinations of wetting agents according to the invention behave when they are used to tint a white interior paint. Accordingly, a white interior emulsion paint (from Rhône-Poulenc[*1]) was tinted with pastes 1 to 7 and the paint was then knife-coated wet onto a 200 µm Lenetta film. The depth of color of the paint was assessed in comparison with a standard (paint containing paste 1). Pigment pastes 1 to 7 were diluted 1:10 in water. Prior to this preliminary dilution, 1.5 g was added to 98.5 g paint and this batch was dispersed in the Skandex for 30 minutes, without glass beads.

The depth of color of the dried films was then assessed visually and given marks of 1 (good) to 6 (poor). The following results were obtained:

TABLE 4

Assessment of the depth of color of emulsion paints tinted with different pigment pastes

| Batch No. | 1 | 2 | 3 | 4 | 5 | 6 | 7 |
|---|---|---|---|---|---|---|---|
| Depth of color (marks) | 4 | 2 | 5 | 2 | 1 | 2 | 1 |

It can be seen that the paints containing the mixtures of dispersing agents according to the invention show the best tinting results.

Formulation of the interior emulsion paint used:
1) Stock batch:

| | |
|---|---|
| 409.0 g | Water |
| 5.0 g | Calgon N (10%) (Ladenburg BK; polyphosphate) |
| 2.0 g | Dispex N40 (Allied Colloids; polyacrylate) |
| 2.0 g | Preventol D7 (Borchers GmbH; preservative for binder) |
| 2.0 g | Nopco 8034 E/D (Henkel KGaA; mineral oil defoamer) |
| 1.0 g | NaOH (10%) |
| 4.0 g | Natrosol 250 HBR (cellulose ether; Aqualon B.V.) |
| 220.0 g | Titanium dioxide RL 68 (Rhône-Poulenc) |
| 50.0 g | Setacarb OG (chalk; Omya GmbH) |
| 40.0 g | Omyacarb 5 GU (calcite; Omya GmbH) |
| 70.0 g | Talc IT 325 (talc; Norwegian talc) |
| 50.0 g | Nainisch SE super (heavy spar; Luzenac) |

The stock batch is dispersed for approximately 10 minutes in the dissolver at 3000 rev/min. The paste is allowed to stand for 24 hours and then the binder and the thickener are added thereto.

2) Coating batch:

| | |
|---|---|
| 855.0 g | Stock batch |
| 140.0 g | Rhodapas DS 1029 (styrene-acrylate dispersion, Rhône-Poulenc) |
| 1.0 g | Nopco 8034 E/D (see above) |
| 5.7 g | Borchigel VP 9628 (PU thickener; Borchers GmbH) |

The paste and the other added constituents were homogenized for 5 to 7 minutes in the basket stirrer at approximately 1000 rev/min.

The finished paint was allowed to stand for 24 hours and then tinted.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous dispersion which contains a pigment and/or a filler and also contains a dispersing agent comprising A) 50 to 90 wt. % of a non-ionic alkylene oxide adduct having a number average molecular weight of 2000 to 100,000, B) 0 to 40 wt. % of a salt of a polycarboxyl compound, C) 5 to 40 wt. % of a salt of an acidic (poly)phosphate ester and D) 0 to 60 wt. % of a water-soluble or water-dispersible polyurethane oligomer, wherein the sum of the components A)+B)+C)+D) equals 100 wt. %, based on the weight of A), B), C) and D), and the amount of at least one of components B) or D) is not 0.

2. The aqueous dispersion of claim 1 wherein component A) comprises the condensation product of an alkylene oxide containing 2 to 20 carbon atoms with a mono-, di- or polyfunctional, optionally substituted phenol, alcohol, thioalcohol or amine.

3. The aqueous dispersion of claim 1 wherein component A) comprises a compound corresponding to formula (I)

$$R_1-\underset{}{\underset{}{\bigcirc}}-O-[CH_2-\underset{R_2}{CH}-O]-, \quad (I)$$

wherein
R$_1$ represents an aliphatic, aromatic or araliphatic group having 1 to 40 carbon atoms, R₂ represents hydrogen, phenyl or an alkyl group having 1 to 12 carbon atoms and n has a value of 1 to 200.

4. The aqueous dispersion of claim 1 wherein component B) comprises a homo- or copolymer of aspartic acid or a salt thereof having a number average molecular weight of 200 to 30,000.

5. The aqueous dispersion of claim 3 wherein component B) comprises a homo- or copolymer of aspartic acid or a salt thereof having a number average molecular weight of 200 to 30,000.

6. The aqueous dispersion of claim 1 wherein component B) comprises an iminodisuccinate.

7. The aqueous dispersion of claim 3 wherein component B) comprises an iminodisuccinate.

8. The aqueous dispersion of claim 1 wherein component C) comprises a salt of a mono- and/or dialkylphosphate ester.

9. The aqueous dispersion of claim 2 wherein component C) comprises a salt of a mono- and/or dialkylphosphate ester.

10. The aqueous dispersion of claim 3 wherein component C) comprises a salt of a mono- and/or dialkylphosphate ester.

11. The aqueous dispersion of claim 4 wherein component C) comprises a salt of a mono- and/or dialkylphosphate ester.

12. The aqueous dispersion of claim 5 wherein component C) comprises a salt of a mono- and/or dialkylphosphate ester.

13. The aqueous dispersion of claim 6 wherein component C) comprises a salt of a mono- and/or dialkylphosphate ester.

14. The aqueous dispersion of claim 7 wherein component C) comprises a salt of a mono- and/or dialkylphosphate ester.

15. The aqueous dispersion of claim 1 which contains an organic pigment selected from the group consisting of phthalocyanines, benzidines, arylamide yellow, nickel azo yellow, diarylidones, isoindolines, perylene red, thioindigo red, quinacridone violet and carbon black.

16. The aqueous dispersion of claim 1 which contains an inorganic pigment selected from the group consisting of titanium dioxide, iron oxides, zinc oxides, chromates, molybdates and cobalt spinels.

17. The aqueous dispersion of claim 1 which contains a filler selected from the group consisting of silicates, aluminum titanates, silicon nitrites, barium sulfate and calcium sulfate.

18. The aqueous dispersion of claim 1 wherein the dispersing agent is present in an amount of 0.02 to 200 wt. %, based on the remaining solids content of the aqueous dispersion.

* * * * *